Nov. 21, 1961      G. W. WITHERBY      3,009,246
WALLPAPER EDGE TRIMMER

Filed June 14, 1960      2 Sheets-Sheet 1

George W. Witherby
INVENTOR.

BY *Clarence A. O'Brien*
and *Harvey B. Jacobson*
Attorneys

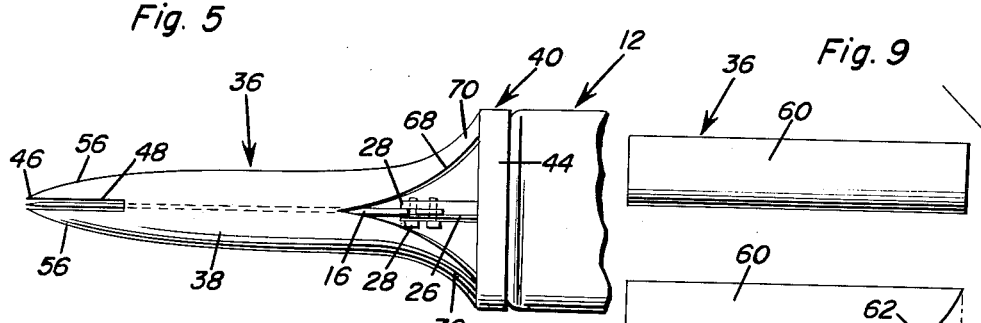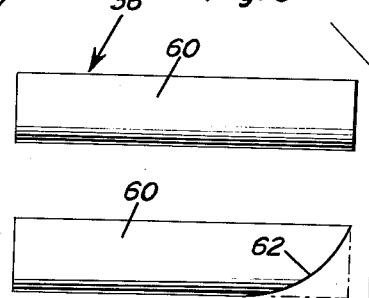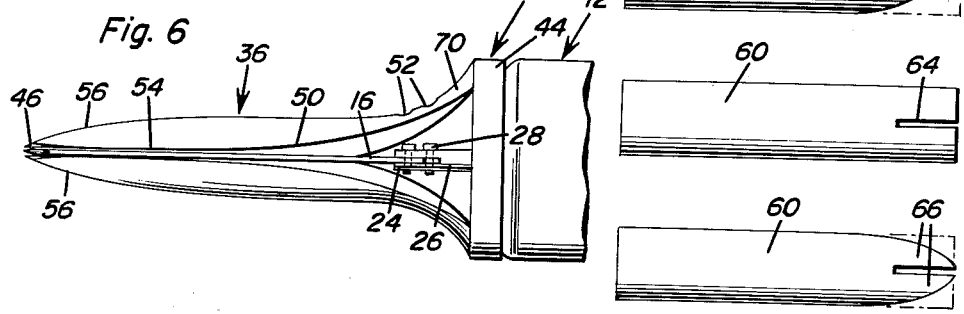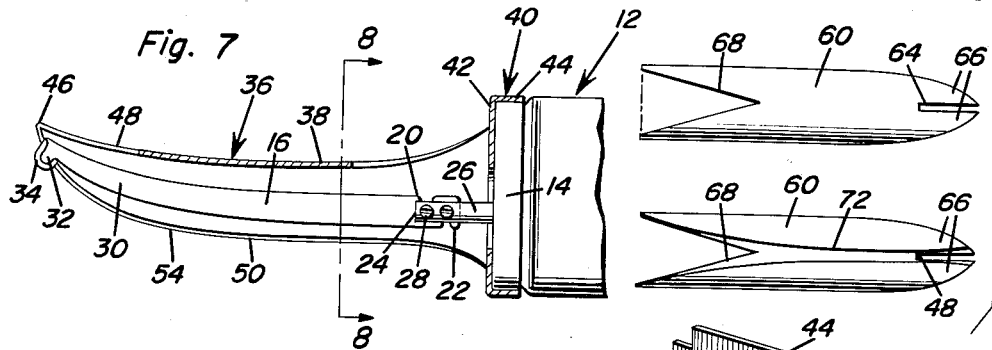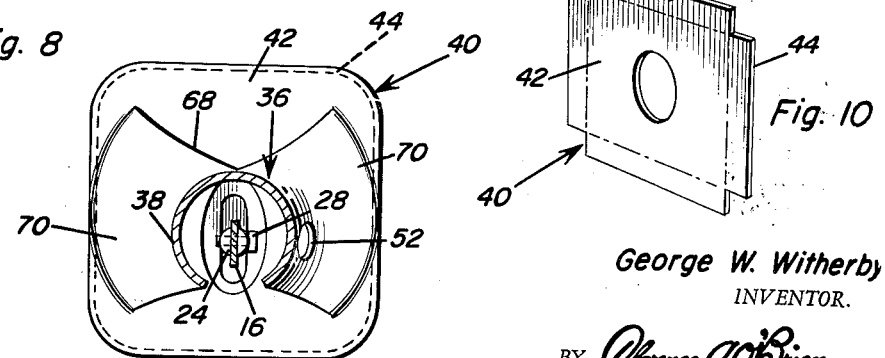

United States Patent Office 3,009,246
Patented Nov. 21, 1961

3,009,246
WALLPAPER EDGE TRIMMER
George W. Witherby, 2638 Lincoln Ave., Ogden, Utah, assignor of one-half to Harry D. Reeve, Ogden, Utah
Filed June 14, 1960, Ser. No. 36,015
5 Claims. (Cl. 30—272)

This invention relates to an improved device for trimming and edging wallpaper after it has been pasted, cut to desired strip-length, and hung or applied to a wall, and an object of the invention is to provide a practical easy-to-use trimmer which is power-driven.

Briefly, the invention has to do with a draw-type cutting tool which may be handled and maneuvered with a single hand, allowing the free hand to catch hold of and dispose of the cut-off paper. More specifically, the tool comprises a power unit, a vibrator for example, having a suitably shaped body or casing which may be grasped and held in a hand of a user, said vibrator having a motion transmitting member, a laterally vibrated blade joined to and projecting forwardly from said member, a sheath fixed to a forward portion of said body and enclosing and protectively housing said blade, said sheath having a leading end portion to movably contact the applied wallpaper, said end portion shaped and contoured to bear against the wallpaper and pilot and guide the draw cut movement of the blade, the leading end of said blade having a cutting element exposed for use and up and down cleaving action and normally projecting operatively beyond said adjacent surfaces of said sheath.

The invention also features a structurally and functionally unique sheath, that is, a rigid hollow blade housing which serves not only as a safety-type guard for the blade, but is so made that it constitutes a wallpaper holddown and pressure applying finger. Not only this, the finger has its forward or outer end portion so shaped that it pilots and guides the blade's cutting element and, in addition, provides a fulcrum which enables the user to rock and otherwise utilize the relatively movable cutting element to full advantage where complex cutting around door and window casings is required. Then too, by reducing the cross-section and tapering the leading end of the sheath a special tip or beak is had, said beak assisting in maneuvering the sheath with requisite nicety.

Another object of the invention is to utilize a construction having the features and advantages set forth and wherein the same takes the form of an attahcment, that is, a comparatively simple, practical and economical blade which may be fashioned from a flexibly resilient heavy duty hack saw blade, and a sheath which may be fashioned from a brass or an equivalent metal tube. To this end the attachable end of the tube or sheath comprises a simple adapter which may be applied to a cooperating forward end portion of a conventional-type vibrator.

Construed along other lines, the aforementioned attachment is characterized by an elongated hollow sheath constituting a rigid elongated presser finger, said sheath having means at a rearward end for connection to a vibrator, the forward end of said sheath being gradually decreased in cross-section and terminating in a piloting and guiding tip, said sheath having a slotted bottom side, the forward portion of the bottom side curving and sloping toward the tip and constituting a fulcrum, and a flexibly resilient blade confined and guarded for operation in the hollow portion of the sheath, the leading end of the blade having a laterally projecting lug with sharp marginal edges defining a cleaving or cutting element, and means cooperating with said blade for vibrating and moving the cutting element relative to the sheath.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a top plan view with a portion of the vibrator broken away.

FIG. 6 is a bottom plan view of the same.

FIG. 7 is a central longitudinal sectional view with parts appearing in elevation.

FIG. 8 is an enlarged cross-section on the plane of the line 8—8 of FIG. 7.

FIG. 9 is a group view showing the manner in which the brass tube is cut and fashioned to provide the improved sheath.

FIG. 10 is a view in perspective of a plate which is made into an adapter and on which the adjacent rearward end of the sheath is welded or otherwise fixedly mounted.

Figure 1:
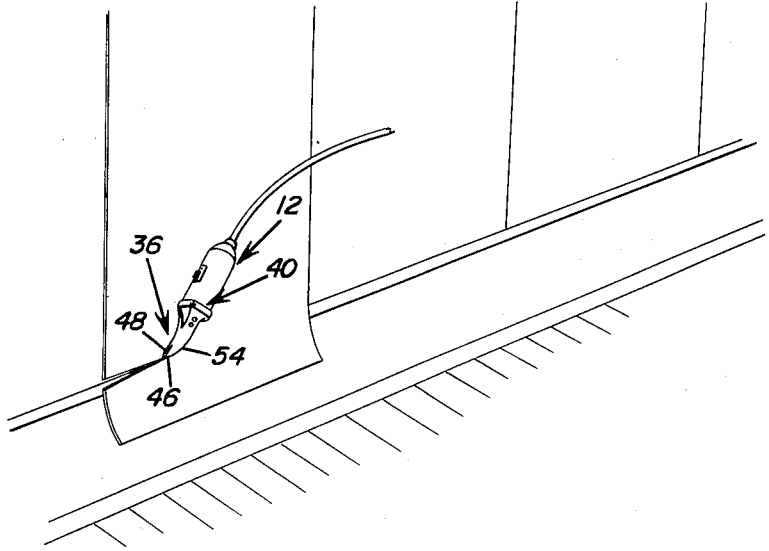
FIG. 1 is a view in perspective showing a fragmentary portion of a room wall, the baseboard and a strip of wallpaper in the act of being trimmed by the herein disclosed trimmer.
Figure 2:
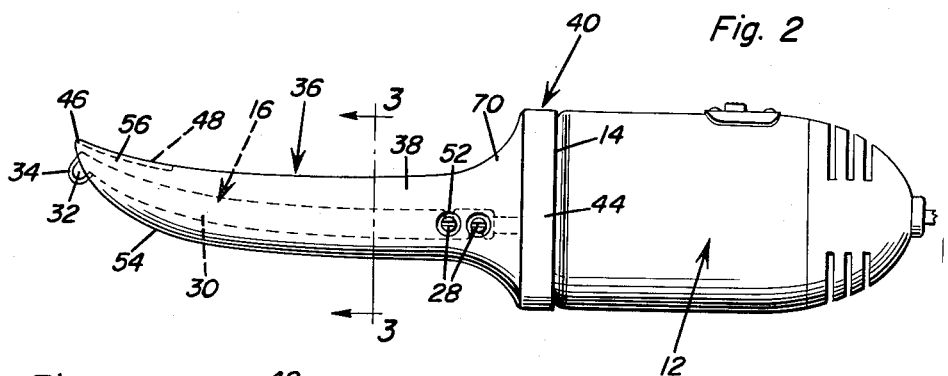
FIG. 2 is a view in side elevation of the trimmer on a larger scale.
Figure 3:
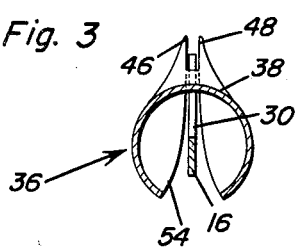
FIG. 3 is a cross-section on the line 3—3 of FIG. 2.

In FIGS. 1 and 2 the power generating and supply unit or means preferably, but not necessarily, comprises an appropriate conventional type vibrator 12 to the forward end portion 14 of which the edging and trimming attachment is connected.

The blade, which is fashioned from a heavy duty hacksaw blade, is denoted by the numeral 16 and the straight inner or rearward end portion is provided with oppositely opening attaching notches 20 and 22.

Figure 4:
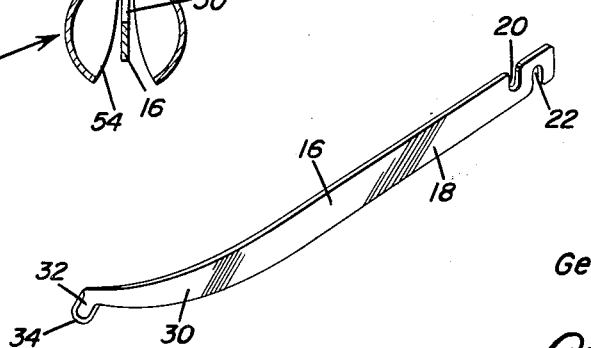
FIG. 4 is a view in perspective of the readily applicable and removable blade.

This notched end portion of the blade is removably mounted between furcations 24 on the forward or leading end of the motion transmitting and vibrating member 26. Assembling and clamping screws 28 are used in the manner shown and provide a satisfactory operating connection. The forwardly and upwardly curved end portion 30 (FIG. 4) of the blade terminates in an oblique-angled or laterally projecting lug 32 providing the vibratory cutting element. This cutting element is substantially sector-shaped in side elevation and the entire marginal edge is beveled to provide a substantially U-shaped cutting edge 34.

The elongated rigid finger-like sheath is denoted by the numeral 36 and is preferably hollow in construction and is of a shape in cross-section to enclose and properly house and protectively guard the blade and cutting element. This sheath is primarily circular in cross-section and is reduced in cross-section from the rearward toward the forward end and includes a generally straight body portion 38 the inner end of which is secured to the adapter 40. The adapter comprises a plate 42 having lateral flanges 44 defining a cap which is fitted over the end portion 14 and suitably secured in place (not detailed). It will be noticed that the leading or forward end of the sheath is gradually reduced in cross-section and tapers to a point 46 which may be here described as a piloting and guiding beak. The upper portion adjacent the beak is provided with a slot 48 opening through the leading end. The entire bottom side (bottom in the views of the drawings) is provided with a lengthwise slot 10 which permits the blade to be inserted and removed. Side holes 12 provide access to the screws or fasteners 28 as is evident from FIGS. 2 and 6. The forward end portion of the bottom is longitudinally curved conformable with the curvature 30 of the blade and this curved surface provides a convenient fulcrum 54 which acts in conjunction with the beak and permits the user to draw this finger-like sheath along the crease or crevice in the manner illustrated in FIG. 1. This curved fulcrum merges into the pointed beak. In addition, the horizontal sides of the leading end portion taper and merge into the beak and provide convex cheeks 56 (FIGS. 5 and 6) and these coacting component features (the curvature fulcruming surface 54, the pointed beak 46 and the tapering convex cheeks 56) coact in enabling the user to achieve the desired hold-down and draw-along action. In fact, one may tilt and rock the over-all tool to the desired angle, as generally shown in FIG. 1. Also, it is possible to turn the entire tool axially to skillfully apply the cutting element so that it will cleave or sever the paper in a straight line or whatever contour has to be coped with handling the tool. The cutting element normally protrudes through the leading end of the slot 50 just inwardly or rearwardly of the beak 46. The slot 48 which is diametrically opposite to the slot 50 allows blade clearance if and when the applied pressure of the finger-like sheath calls for clearance.

Although the novel sheath may be a one-piece casting or perhaps molded from a suitable grade of commercial plastics, an experimental model has been satisfactorily fashioned from a single length of brass or an equivalent metal tube. With reference to FIG. 9 the tube is denoted by the numeral 60 and it is this tube which provides the aforementioned sheath 36. In carrying out this aspect of the concept one end portion 62 is cut away on a curved line of the curvature illustrated. Next, a relatively short slot 64 is cut in the end of the tube and this slot constitutes the aforementioned clearance slot 48 in the finished sheath. (Different numerals are being employed here to differentiate between the procedural steps and the finished article.) The diametrically opposite sides, that is, opposite the cut or slot 64 are pressed and squeezed in in the manner shown at 66 and these side portions provide the aforementioned forwardly tapering cheeks 56. The next step involves cutting a substantially V-shaped notch 68 which is designated by the same numeral 68 in FIG. 6 and which permits spreading of the end portion to provide the attaching members 70. Finally, the entire bottom side of the tube is formed with a cut ranging from end to end, this cut being denoted at 72 and the left hand end being widened to cooperate with the notch 68 and the attachable end portions 70. Actually this lengthwise cut 72 provides the aforementioned blade inserting and removing slot 50 seen in FIG. 7.

It is evident that the instant power-driven tool or trimmer is constructed and designed to trim the wallpaper after it has been applied to the wall. The paper is brushed on to the wall in the usual manner, thus leaving a corner crease or crevice visible. The uniquely shaped leading end of the sheath and the cooperating curved end portion of the blade and projecting cutting element cooperate in permitting the powered blade which is vibrated up and down to be drawn along the crease and manipulated in small corners, leaving a smooth, straight cut. The specially designed contouring and shape of the rigid finger-like sheath enables the user to satisfactorily fit and cut wallpaper at virtually all contours. The overall tool or device is comparatively light in weight and may be used with one hand, leaving the other end free to gather and dispose of the cuttings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A draw-type wallpaper trimmer comprising an elongated hollow sheath providing a rigid elongated wallpaper hold-down and guiding finger, a power actuated vibrator having a motion transmitting shaft, said sheath having means at a rearward end for connection to said vibrator, the median and forward end of said sheath being gradually decreased in cross-section and terminating in a beak-like laterally offset finger piloting and guiding tip, said sheath having a longitudinally slotted bottom side, the forward portion of said bottom side curving gradually and sloping toward the tip and constituting a guide and a fulcrum, and a flexibly resilient blade of a length slightly less than and confined and guarded for operation in the hollow portion of the sheath, a rearward end of said blade being connected with and operable by said shaft, the leading end of the blade having a laterally projecting lug with sharp marginal edges and defining a cutting element, said cutting element being in line with a cooperating portion of the slot and being movably operable through the plot.

2. For use in trimming and finishing an edge of wallpaper after a strip thereof has been applied and brushed against a wall surface; a manually held and guided draw-type edge trimmer comprising, in combintion, power supply means having a body of a size and shape that may be grasped and held in a hand of a user, said means having a motorized axially extending motion transmitting member, an elongated blade joined at one end to and projecting forwardly and in axial alignment from said member, a rigid sheath fixed to and aligned with a forward portion of said body and enclosing the major part of said blade, said sheath having a leading end portion to movably contact and ride along a surface of the applied wallpaper, said end portion being externally shaped and contoured to bear firmly against the wallpaper in a manner to pilot and guide the draw-cut movement of the blade across the wallpaper, the leading end of said blade being flexibly resilient and having a lateral cutting element exposed through a slot in the sheath, the leading end of said blade being flexibly resilient and having a lateral cutting element exposed through a slot in the sheath for use and action and normally projecting operatively beyond adjacent surfaces of said sheath, said sheath comprising a rigid elongated guard resembling a stiff human finger, that side of the sheath defining the aforementioned adjacent surfaces being curved lengthwise and permitting the sheath to be pressed firmly against and drawn along baseboard molding, window and door frame members and expeditiously maneuvered in corners and elsewhere while, at the same time, not hampering the cleaving action of the relatively movable cutting element, said cutting element being sector-shaped in side elevation, and the entire marginal edge of element being sharpened.

3. The combination of claim 2, and wherein the tip of the leading end of said sheath projecting a minimal distance beyond said cutting element, being reduced in cross-section and providing a piloting break.

4. An attachment for a motion transmitting device which may be held and moved with a single hand of the user; a draw-type wallpaper edger and trimmer comprising an elongated flexibly resilient blade having means at an inner end for operating connection with motion delivering means provided therefor on said device, the outer terminal end of said blade having a lateral lug with a curved marginal edge sharpened and providing a cutting element, an elongated sheath in which said blade is protectively enclosed and, except for said lug, wholly housed, the bottom of said sheath having a lengthwise slot in and through an end portion of which said cutting element is movably operable, said sheath being hollow, the inner end of said sheath having means for attachment to said motion transmitting device, said sheath being of a length greater than the overall length of the blade and the forward leading end being circular in cross-section, tapered and terminating in a pointed piloting and guiding beak, that portion of the sheath which contacts the wallpaper being curved lengthwise toward said beak and providing a longitudinal fulcrum whereby to permit the outer end portion of the sheath and the cutting element to be rocked and otherwise handled to best advantage where irregular crevices and places difficult-of-access are encountered, diametrically opposite side-surfaces of the sheath immediately adjacent to said cutting element being convex and sloping toward said beak.

5. An attachment for a motion transmitting device which may be held and moved with a single hand of the user; a wallpaper edger and trimmer comprising an elongated flexibly resilient blade having means at an inner end for operating connection with motion delivering means of said device, the inner and median portions of said blade being linearly straight, the outer end of said blade being decreased in cross-section, curved laterally and having a lateral lug with a U-shaped curved marginal edge sharpened and providing a cutting element, and an elongated hollow sheath in which said blade is protectively and operatively enclosed and housed, the bottom of the sheath having a slot greater in length than the length of the blade and in and through which said cutting element is projected and movably operable, the inner end of said sheath having means for separable but operable connection with said motion transmitting device, said sheath being of a length greater than the overall length of the blade and the forward leading end portion being reduced in cross-section, tapered and terminating in a pointed piloting and guiding beak, the top of the sheath having a blade clearance slot opening forwardly through said leading end.

References Cited in the file of this patent
UNITED STATES PATENTS

| | | |
|---|---|---|
| 1,574,641 | Christopherson | Feb. 23, 1926 |
| 1,863,153 | Christopherson | June 14, 1932 |
| 2,227,727 | Leggiadro | Jan. 7, 1941 |
| 2,629,928 | Maravcik | Mar. 3, 1953 |